Patented Dec. 19, 1939

2,183,999

UNITED STATES PATENT OFFICE 2,183,999

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application October 5, 1938, Serial No. 233,478

18 Claims. (Cl. 8—50)

This invention relates to azo dye compounds containing a 1-amino-5-hydroxynaphthalene or a 1-amino-5-oxygen-alkylnaphthalene nucleus and in which one or both of the hydrogen atoms of the 1-amino group is substituted by a tetrahydrofuryl group which is attached to the nitrogen atom of said amino group through the carbon atom in the 2-position by means of a saturated straight chain hydrocarbon radical and their application to the art of dyeing or coloring. More particularly, the invention includes the azo dye compounds, the process for their preparation, the application of the nuclear non-sulfonated azo dye compounds for the dyeing or coloring of organic derivatives of cellulose and materials made of or containing an organic derivative of cellulose dyed or colored with said nuclear non-sulfonated azo compounds.

Organic derivatives of cellulose are characterized by an indifferent affinity for the usual cotton or wood dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The present application is a continuation in part of our application Serial No. 189,170, filed February 7, 1938. In said application Serial No. 189,170, we have disclosed azo dye compounds having a tetrahydrofuryl group attached to an amino group which is a nuclear substituent of a benzene or naphthalene nucleus and their application to the dyeing of organic derivatives of cellulose, wool, cotton and silk. The present invention, as above indicated, is directed to azo dye compounds containing a 1-amino-5-hydroxynaphthalene or a 1-amino-5-oxygen-alkylnaphthalene nucleus and in which one or both of the hydrogen atoms of the 1-amino group is substituted by a tetrahydrofuryl group, which is attached to the nitrogen atom of said amino group through the carbon atom in the 2-position by means of a saturated straight chain hydrocarbon radical. Azo compounds containing this nucleus have been found to be particularly of value for the dyeing of organic derivatives of cellulose, wool, cotton and silk. Broadly speaking, the dye compounds of the present invention are included within the scope of our said application Serial No. 189,170 but they are neither specifically disclosed therein nor specifically claimed therein.

The azo dye compounds of our invention have the general formula:

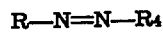

wherein R represents the residue of an aromatic nucleus and R4 represents the residue of a 1-amino-5-hydroxynaphthalene or a 1-amino-5-oxygen-alkylnaphthalene nucleus containing a tetrahydrofuryl group attached to the nitrogen atom of said amino group through the carbon atom in the 2-position by means of a saturated straight chain hydrocarbon radical. Advantageously, R is an aryl nucleus of the benzene series.

Ordinarily, R4 will be a 1-amino-5-hydroxynaphthalene or a 1-amino-5-oxygen-alkylnaphthalene nucleus having the general formula:

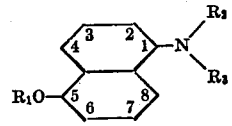

wherein $R_1$ represents hydrogen or alkyl, $R_2$ represents a tetrahydrofuryl group joined to the nitrogen atom through the carbon atom in the 2-position by means of a saturated straight chain hydrocarbon radical and $R_3$ represents hydrogen, an alkyl group, a cycloalkyl group, an aryl group or a tetrahydrofuryl group joined to the nitrogen atom through the carbon atom in the 2-position by means of a saturated straight chain hydrocarbon radical.

The naphthalene nucleus in the formula just given may contain other nuclear substituents in addition to those specifically shown. The naphthalene nucleus may be further substituted, for example, with a halogen atom such as chlorine or bromine, an alkyl group such as methyl, ethyl or propyl, an alkoxy group such as methoxy or ethoxy and a nitro group.

Similarly, it will be understood that the aromatic nucleus designated R can contain substituents. The aromatic nucleus R, which is ordinarily an aryl nucleus of the benzene series, may be substituted, for example, with a halogen atom, an alkyl group, an alkoxy group, a hydroxy group or a nitro group as more fully appears hereinafter. When $R_1$ is an alkyl group, it may be an unsubstituted alkyl group such as methyl, ethyl or propyl or a substituted alkyl group such as β-hydroxyethyl, γ-hydroxypropyl,

or $-CH_2CH_2OC_2H_5$, for example. When $R_3$ is alkyl, it may be an alkyl group such as methyl, ethyl, propyl or butyl or a substituted alkyl group such as β-hydroxyethyl, β-hydroxypropyl, β, γ-hydroxypropyl, hydroxybutyl, —CH₂CH₂SO₃H, —CH₂CH₂CH₂SO₃H, —CH₂CH₂—O—CH₃ or —CH₂CH₂—O—C₂H₅, for example. Similarly, when R₃ is aryl, it may be an aryl nucleus such as phenyl, chlorophenyl, nitrophenyl or alkoxyphenyl and when it is cycloalkyl, it may be cyclohexyl, for example. It will be understood that the above illustrations given in connection with R, R₁ and R₃ are given by way of example and are not intended to be limitative of the invention.

Normally the saturated straight chain hydrocarbon radical, joining the tetrahydrofuryl group to the nitrogen atom of the 1-amino group, contains not more than four carbon atoms. This saturated straight chain hydrocarbon radical may be —CH₂—, —CH₂CH₂—, —CH₂CH₂CH₂—, and —CH₂CH₂CH₂CH₂—, for example. Most commonly, it contains but one carbon atom.

In order that the numbering previously referred to in connection with tetrahydrofuryl may be clearly understood, it will be noted that the tetrahydrofuryl group has the formula:

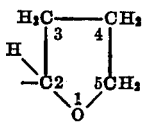

and is numbered as indicated. It is this numbering which will be employed throughout the specification and claims.

The expression "a tetrahydrofuryl group" appearing herein and in the claims includes not only the tetrahydrofuryl group itself but also tetrahydrofuryl derivatives such as 5-methyltetrahydrofuryl, 5-ethyltetrahydrofuryl, 5-β-hydroxyethyltetrahydrofuryl and 5-γ-hydroxypropyltetrahydrofuryl.

The compounds of our invention can be prepared by diazotizing a suitable aromatic amine and coupling the diazonium compound formed in an acid medium, for example, with a 1-amino-5-hydroxynaphthalene or a 1-amino-5-oxygen-alkylnaphthalene, capable of coupling, containing a tetrahydrofuryl group attached to the nitrogen atom in the 1-position through the carbon atom in the 2-position by means of a saturated straight chain hydrocarbon radical. Ordinarily, the coupling is believed to take place in the 4-position of the 1-amino-5-hydroxynaphthalene or the 1-amino-5-oxygen-alkylnaphthalene compound.

The nuclear non-sulfonated azo compounds of our invention constitute valuable dyes which are particularly of value for the dyeing of materials made of or containing organic derivatives of cellulose although they possess some application for the dyeing of textile materials such as wool and silk, for example. Dyeings produced employing said non-sulfonated azo compounds are, in general, of good fastness to light and washing and yield shades which are generally blue or blue-green. Nuclear sulfonated compounds having the general formula given in connection with the azo dye compounds of our invention may be prepared in known fashion and possess application for the dyeing of textile materials such as wool, cotton and silk. The shades yielded by these nuclear sulfonated compounds are likewise generally blue or blue-green.

The following examples illustrate the method of preparation of the azo compounds of our invention:

*Example 1*

12.8 grams of o-chloroaniline are dissolved in 150 cc. of water to which has been added 25 cc. of 36% hydrochloric acid. The resulting solution is cooled to a temperature of 0–5° C. by the addition of ice, for example, and the amine is diazotized while maintaining a temperature of 0–5° C. by adding, with stirring, a water solution of 6.9 grams of sodium nitrite.

24.3 grams of 1-tetrahydrofurfurylamino-5-hydroxynaphthalene are dissolved in cold dilute hydrochloric acid (0–10° C., for example) and the diazo solution prepared above is slowly added with stirring. Following the addition of the diazo solution, the mixture is permitted to stand for a short time after which it is slowly made neutral to Congo red paper by the addition of an alkaline agent such as sodium acetate or sodium carbonate which effects completion of the coupling reaction. Upon completion of the coupling reaction, the dye compound formed is recovered by filtration, washed with water and dried. The dye compound obtained has the probable formula:

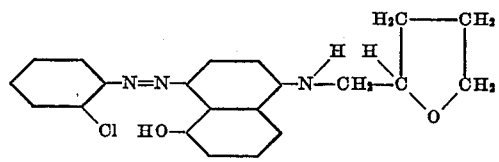

and colors cellulose acetate silk a yellow shade.

*Example 2*

31.6 grams of

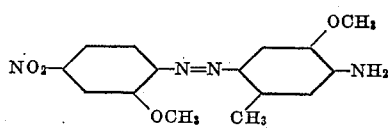

are added to 200 cc. of water to which has been added 40 cc. of 36% hydrochloric acid. The resulting mixture is then cooled to a temperature of about 20° C. and diazotized at this temperature by adding, with stirring, a water solution of 6.9 grams of sodium nitrite.

24.3 grams of 1-tetrahydrofurfurylamino-5-hydroxynaphthalene are dissolved in cold dilute hydrochloric acid (0–10° C., for example) and the diazo solution prepared above is slowly added, with stirring. Following the addition of the diazo solution, the mixture is permitted to stand for a short time after which it is slowly made neutral to Congo red paper by the addition of an alkaline agent such as sodium acetate or sodium carbonate which effects completion of the coupling reaction. Upon completion of the coupling reaction, the dye compound formed is recovered by filtration, washed with water and dried. The dye compound obtained has the probable formula:

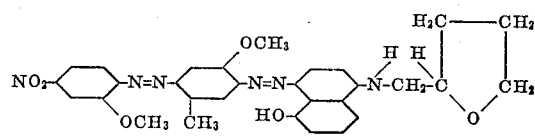

and colors cellulose acetate silk a blue shade.

*Example 3*

A. 7.6 grams of sodium nitrite are dissolved in 53 cc. of sulfuric acid (sp. gr. 1.84), warmed to 70° C. and then cooled to 10–15° C.

B. 18.3 grams of 2,4-dinitroaniline are dissolved in 220 cc. of hot concentrated acetic acid and then the mixture is rapidly cooled to room temperature.

The mixture formed in B is then added to the solution formed in A with stirring, while maintaining a temperature of 10–15° C. This addition requires about 30 minutes. Following this addition, the resulting mixture is stirred for one hour and then 1 gram of urea is added.

24.3 grams of 1-tetrahydrofurfurylamino-5-hydroxynaphthalene are dissolved in dilute hydrochloric acid and the mixture is cooled to a temperature of 0–10° C. by the addition of ice. The diazo solution prepared as described above is then slowly added with stirring. Upon complete addition of the diazo solution, the mixture is allowed to stand after which it is slowly made neutral to Congo red paper by the addition of sodium acetate whereby the coupling reaction is completed. Upon completion of the coupling reaction, the dye compound is recovered by filtration, washed with water and dried. The dye compound has the probable formula:

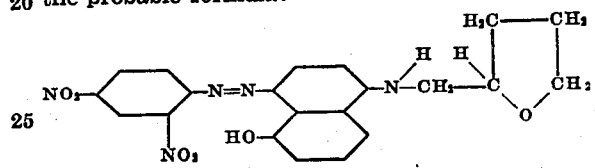

and dyes cellulose acetate silk a blue shade from an aqueous suspension.

*Example 4*

29.1 grams of

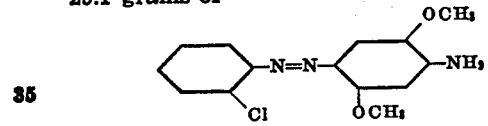

are diazotized in accordance with the method described in Example 2 and the diazonium compound resulting is coupled with 28.8 grams of 1-β-hydroxyethyltetrahydrofurfurylamino-5-hydroxynaphthalene in accordance with the method described in Example 1. The dye compound obtained has the probable formula:

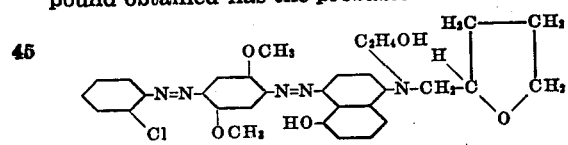

and colors cellulose acetate silk a blue shade.

*Example 5*

21.8 grams of 2,4-dinitro-6-chloroaniline are diazotized in accordance with the method described in Example 3 and the diazonium compound obtained is coupled with 24.3 grams of 1-tetrahydrofurfurylamino - 5 - hydroxynaphthalene. The coupling may be carried out as described in Example 3. The dye compound obtained colors cellulose acetate silk a blue-green shade.

*Example 6*

20.8 grams of 2,4-dinitro-6-cyanoaniline are diazotized in accordance with the method described in Example 3 and the diazonium compound obtained is coupled with 28.5 grams of 1-tetrahydrofurfurylamino-2,3-dimethyl-5-hydroxynaphthalene. The coupling may be carried out in accordance with the procedure set forth in Example 3. The dye compound obtained colors cellulose acetate silk a blue-green shade.

*Example 7*

26.2 grams of 2-amino-3,5-dinitrobenzenesulfonamide are diazotized in accordance with the method described in Example 3 and the diazonium compound obtained is coupled with 30 grams of

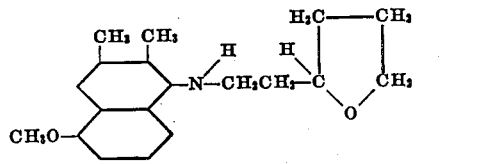

The coupling may be carried out in accordance with the procedure set forth in Example 1. The dye compound obtained colors cellulose acetate silk a blue shade.

*Example 8*

13.8 grams of p-nitroaniline are diazotized and the diazonium compound obtained is coupled with 25.7 grams of

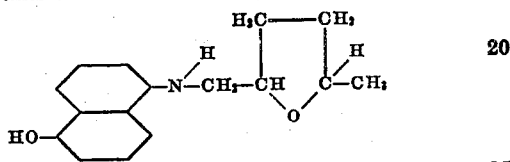

The coupling may be carried out in accordance with the general method described in Example 3. The dye compound obtained colors cellulose acetate silk a blue shade.

*Example 9*

18.9 grams of 6-methoxy-2-aminobenzothiazole,

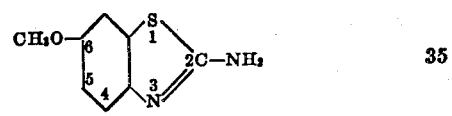

are dissolved in a warm mixture of 55 cc. of water and 16 cc. of formic acid and following solution the mixture is cooled and added to a cold mixture of 50 cc. of water and 110 grams of concentrated sulfuric acid (sp. gr. 1.84). The amine is then diazotized at a temperature of —5° C. by the addition with stirring of a water solution of 6.9 grams of sodium nitrite.

32.9 grams of 1-tetrahydrofurfurylsodium-β-sulfoethylamino-5-naphthol are dissolved in water and the resulting solution is cooled to a temperature approximating 0–10° C. The diazo solution prepared above is then slowly added, with stirring, while maintaining the mixture at a temperature of about 0–10° C. Following the addition of the diazo solution, the mixture is slowly made neutral to Congo red paper by the addition of sodium carbonate and when the coupling reaction which has been taking place is complete the dye is precipitated by the addition of sodium chloride, recovered by filtration, and dried. The dye compound obtained in accordance with this example is water soluble and may be directly employed without using a dispersing or solubilizing agent for dyeing. It colors cellulose acetate silk, wool and silk a blue shade.

1-tetrahydrofurfurylsodium-β-sulfatoethylamino-5-naphthol or 1-tetrahydrofurfurylsodium-β-phosphatoethylamino-5-naphthol, for example, may be used in place of the coupling component of the above example to obtain water soluble dyes included within the scope of our invention.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component". The diazotization and coupling reactions may, for example, be carried out following the general procedure described in Examples 1 to 9 inclusive.

The above dye compounds color silk and wool the same or generally similar shades as cellulose acetate. Sulfonated compounds corresponding to the above dye compounds, that is, in which the aromatic nucleus is sulfonated, may be prepared in known fashion. These sulfonated compounds

| Amine | Coupling component | Color on cellulose acetate silk |
|---|---|---|
| p-Nitroaniline | 1. 1-ditetrahydrofurfurylamino-5-naphthol | Blue. |
| Do | 2. 1-tetrahydrofurfuryl-β-hydroxyethylamino-5-naphtholmethylether | Do. |
| Do | 3. 1-tetrahydrofurfurylmethylamino-8-methyl-5-naphthol | Do. |
| Do | 4. 1-tetrahydrofurfurylethylamino-2,3-dimethyl-5-naphthol | Do. |
| Do | 5. 1-tetrahydrofurfurylglycerylamino-5-naphthol | Do. |
| Do | 6. 1-tetrahydrofurfurylamino-5-naphthol-β-hydroxyethylether | Do. |
| Do | 7. 1-sodium-β-sulfatoethyltetrahydrofurfurylamino-5-naphthol | Do. |
| Do | 8. 1-(5-methyltetrahydrofurfurylamino)5-naphthol | Do. |
| Do | 9. 1-(5-ethyltetrahydrofurfurylglycerylamino)5-naphthol | Do. |
| Do | 10. 1-ditetrahydrofurfurylamino-2-methyl-5-hydroxy-8-bromonaphthalene. | Do. |
| Do | 11. 1-tetrahydrofurfurylcyclohexylamino-5-naphthol | Do. |
| Do | 12. [structure: HO-naphthalene-N(H)-CH₂CH₂-C(H)(tetrahydrofuran)] | Do. |
| Do | 13. [structure: HO-naphthalene-N(H)-CH₂CH₂CH₂-C(H)(tetrahydrofuran)] | Do. |
| Do | 14. [structure: HO-naphthalene-N(CH₂-tetrahydrofuran)(CH₂CH₂-O-P(=O)(ONa)(OCH₃))] | Do. |
| Do | 15. [structure: C₂H₅O-naphthalene-N(CH₂-tetrahydrofuran)(CH₂CH₂OCH₃)] | Do. |
| 1-amino-2,4-dinitro-6-chlorobenzene | 1-15 above | Blue-Green. |
| 1-amino-2,4-dinitro-6-methylbenzene | do | Blue. |
| 1-amino-2,4-dinitro-6-methoxybenzene | do | Blue-Green. |
| 1-amino-2,4-dinitro-6-cyanobenzene | do | Do. |
| 1-amino-2-chloro-4-nitrobenzene | do | Blue. |
| 1-amino-2-bromo-4-nitrobenzene | do | Do. |
| 2-amino-6-methoxybenzothiazole | do | Do. |
| [structure: NO₂-C₆H₄-N=N-C₆H₂(OCH₃)₂-NH₂] | do | Do. | are useful for the dyeing of wool and silk. As illustrative of sulfonated azo dye compounds included within the scope of our invention may be mentioned the azo dye compounds obtained by coupling diazotized 1-amino-2-sulfonic-4-nitrobenzene or diazotized 1-amino-2-sulfonic benzene with the coupling components in the above tabulation. The dyes so obtained color wool and silk blue or blue-green shades.

It should be noted that, while our invention is concerned primarily with monoazo dye compounds, polyazo dye compounds are likewise included within the scope of our invention as is apparent from the foregoing examples and tabulation. The letter R, in the general formula previously given, will be understood, therefore, to include aromatic components containing an azo bond.

In order that our invention may be fully understood, the preparation of 1-amino-5-hydroxynaphthalene or 1-amino-5-oxygen-alkylnaphthalene compounds suitable for use in the preparation of the azo dye compounds of the invention will now be indicated.

*Preparation of 1-tetrahydrofurfurylamino-5-hydroxynaphthalene*

This compound may be prepared by heating an aqueous mixture of 1,5-naphthol, an alkali metal bisulfite and tetrahydrofurfurylamine to an elevated temperature as more fully described and claimed in our copending application Serial No. 139,610, filed April 30, 1937.

1-tetrahydrofurfurylamino - 5 - oxygen - alkylnaphthalene compounds can be prepared by heating a 1-amino-5-oxygen-alkylnaphthalene compound with an alkali metal bisulfite, such as sodium bisulfite or potassium bisulfite, and tetrahydrofurfurylamine in accordance with the method described in said copending application Serial No. 139,610. 1-amino-5-oxygen-alkylnaphthalene compounds can be prepared by treating 1-amino-5-naphthol with an alkylating agent in known fashion. 1-amino-5-naphthol methyl ether can be prepared, for example, by reacting 1-amino-5-naphthol with methyl iodide. Similarly, 1-amino-5-naphthol ethyl ether can be prepared, for example, by reacting 1-amino-5-naphthol with ethyl sulfate.

By the substitution of other tetrahydrofurylamines for tetrahydrofurfurylamine in the bisulfite reaction referred to above, the corresponding 1-tetrahydrofuryl-5-hydroxynaphthalene or 1-tetrahydrofuryl-5-oxygen-alkylnaphthalene compounds can be prepared.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material to be dyed may be added to the dyebath and the dyeing operation conducted in known fashion. The dye compounds of our invention, which are water soluble, such as those containing a sulfonic acid group in alkali metal salt form, for example, or a phosphoric acid ester group in the form of a water soluble salt, for example, do not, of course, require the use of a dispersing or solubilizing agent but may be applied to silk, wool and (depending upon the nature and position of the water solubilizing group) organic derivatives of cellulose textile materials from an aqueous solution of the dye which may contain salt. For a more complete description as to how the azo dye compounds of our invention may be employed in dyeing or coloring operations, reference may be had to McNally and Dickey U. S. Letters Patent No. 2,115,030, issued April 26, 1938.

It will be understood that the dye compounds disclosed herein are intended to be illustrative and not limitative of the invention. The aromatic nucleus designated R, for example, may contain substituents other than those specifically disclosed. Similarly, the coupling component may contain substituents other than those specifically shown.

We claim:

1. The azo dye compounds having the general formula:

wherein R represents the residue of a member selected from the group consisting of an aryl nucleus of the benzene series and a benzothiazole nucleus and R₄ represents the residue of a member selected from the group consisting of a 1-amino-5-hydroxynaphthalene nucleus and a 1-amino-5-oxygen-alkylnaphthalene nucleus and in which said member contains a tetrahydrofuryl group attached to the nitrogen atom of the amino group in the 1-position through the carbon atom in the 2-position by means of a saturated straight chain hydrocarbon radical.

2. The azo dye compounds having the general formula:

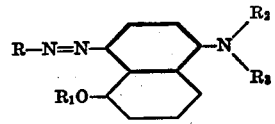

wherein R represents the residue of a member selected from the group consisting of an aryl nucleus of the benzene series and a benzothiazole nucleus, R₁ represents a member selected from the group consisting of hydrogen and alkyl, R₂ represents a tetrahydrofuryl radical attached to the nitrogen atom through the carbon atom in the 2-position by means of a saturated straight chain hydrocarbon radical, R₃ represents a member selected from the group consisting of hydrogen, an alkyl group, a cycloalkyl group, an aryl group of the benzene series and a tetrahydrofuryl radical attached to the nitrogen atom through the carbon atom in the 2-position by means of a saturated straight chain hydrocarbon radical and wherein the naphthalene nucleus may be further substituted.

3. The azo dye compounds having the general formula:

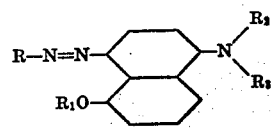

wherein R represents the residue of an aryl nucleus of the benzene series, R₁ represents a member selected from the group consisting of hydrogen and alkyl, R₂ represents a tetrahydrofuryl radical attached to the nitrogen atom through the carbon atom in the 2-position by means of a saturated straight chain hydrocarbon radical, $R_3$ represents a member selected from the group consisting of hydrogen, an alkyl group, a cycloalkyl group of the benzene series, an aryl group and a tetrahydrofuryl radical attached to the nitrogen atom through the carbon atom in the 2-position by means of a saturated straight chain hydrocarbon radical and wherein the naphthalene nucleus may be further substituted.

4. The azo dye compounds having the general formula:

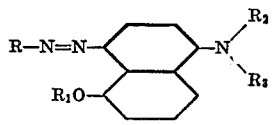

wherein R represents the residue of a member selected from the group consisting of an aryl nucleus of the benzene series and a benzothiazole nucleus, $R_1$ represents a member selected from the group consisting of hydrogen and alkyl, $R_2$ represents a tetrahydrofuryl radical attached to the nitrogen atom through the carbon atom in the 2-position by means of a $(-CH_2-)_n$ linkage wherein $n$ represents 1, 2, 3 or 4, $R_3$ represents a member selected from the group consisting of hydrogen, an alkyl group, a cycloalkyl group, an aryl group of the benzene series and a tetrahydrofuryl radical attached to the nitrogen atom through the carbon atom in the 2-position by means of $(-CH_2-)_n$ linkage wherein $n$ represents 1, 2, 3 or 4 and wherein the naphthalene nucleus may be further substituted.

5. The azo dye compounds having the general formula:

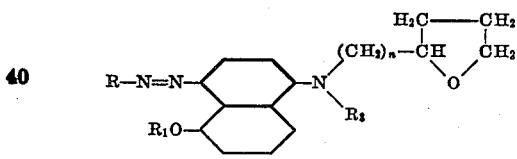

wherein R represents the residue of an aryl nucleus of the benzene series, $R_1$ represents a member selected from the group consisting of hydrogen and an unsubstituted alkyl radical, $n$ represents 1, 2, 3 or 4, $R_3$ represents a member selected from the group consisting of hydrogen, an alkyl group, a cycloalkyl group of the benzene series, an aryl group and a $$-(CH_2)_n-\overset{H_2C\text{------}CH_2}{\underset{O}{CH}}\overset{}{CH_2}$$

group, wherein $n$ represents 1, 2, 3 or 4, and wherein the naphthalene nucleus may be further substituted.

6. The azo dye compounds having the general formula:

wherein R represents the residue of an aryl nucleus of the benzene series, $R_1$ represents a member selected from the group consisting of hydrogen and an unsubstituted alkyl group, $R_3$ represents a member selected from the group consisting of hydrogen, an alkyl group, a cycloalkyl group, an aryl group of the benzene series and a group, and wherein the naphthalene nucleus may be further substituted.

7. The azo dye compounds having the general formula:

wherein R represents the residue of an aryl nucleus of the benzene series.

8. The azo dye compounds having the general formula:

wherein R represents the residue of an aryl nucleus of the benzene series and $R_3$ represents an alkyl group.

9. The azo dye compounds having the general formula:

wherein R represents the residue of an aryl nucleus of the benzene series.

10. The process of coloring material made of or containing an organic derivative of cellulose which comprises applying thereto a nuclear nonsulfonated azo dye compound having the general formula:

wherein R represents the residue of a member selected from the group consisting of an aryl nucleus of the benzene series and a benzothiazole nucleus, $R_1$ represents a member selected from the group consisting of hydrogen and alkyl, $R_2$ represents a tetrahydrofuryl radical attached to the nitrogen atom through the carbon atom in the 2-position by means of a saturated straight chain hydrocarbon radical, $R_3$ represents a member selected from the group consisting of hydrogen, an alkyl group, a cycloalkyl group, an aryl group of the benzene series and a tetrahydrofuryl radical attached to the nitrogen atom through the carbon atom in the 2-position by means of a saturated straight chain hydrocarbon radical and wherein the naphthalene nucleus may be further substituted.

11. The process of coloring material made of or containing an organic derivative of cellulose which comprises applying thereto a nuclear nonsulfonated azo dye compound having the general formula:

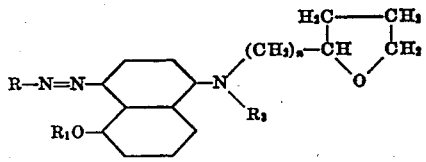

wherein R represents the residue of an aryl nucleus of the benzene series, $R_1$ represents a member selected from the group consisting of hydrogen and an unsubstituted alkyl radical, $n$ represents 1, 2, 3 or 4, $R_3$ represents a member selected from the group consisting of hydrogen, an alkyl group, a cycloalkyl group of the benzene series, an aryl group and a

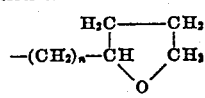

group wherein $n$ represents 1, 2, 3 or 4 and wherein the naphthalene nucleus may be further substituted.

12. Material made of or containing an organic acid ester of cellulose colored with an azo dye compound having the general formula:

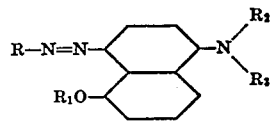

wherein R represents the residue of an aryl nucleus of the benzene series, $R_1$ represents a member selected from the group consisting of hydrogen and alkyl, $R_2$ represents a tetrahydrofuryl radical attached to the nitrogen atom through the carbon atom in the 2-position by means of a saturated straight chain hydrocarbon radical, $R_3$ represents a member selected from the group consisting of hydrogen, an alkyl group, a cycloalkyl group, an aryl group of the benzene series and a tetrahydrofuryl radical attached to the nitrogen atom through the carbon atom in the 2-position by means of a saturated straight chain hydrocarbon radical and wherein the naphthalene nucleus may be further substituted.

13. A cellulose acetate colored with a nuclear non-sulfonated azo dye compound having the general formula:

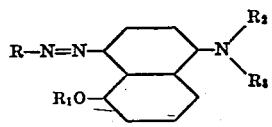

wherein R represents the residue of a member selected from the group consisting of an aryl nucleus of the benzene series and a benzothiazole nucleus, $R_1$ represents a member selected from the group consisting of hydrogen and alkyl, $R_2$ represents a tetrahydrofuryl radical attached to the nitrogen atom through the carbon atom in the 2-position by means of a saturated straight chain hydrocarbon radical, $R_3$ represents a member selected from the group consisting of hydrogen, an alkyl group, a cycloalkyl group, an aryl group of the benzene series and a tetrahydrofuryl radical attached to the nitrogen atom through the carbon atom in the 2-position by means of a saturated straight chain hydrocarbon radical and wherein the naphthalene nucleus may be further substituted.

14. A cellulose acetate colored with a nuclear nonsulfonated azo dye compound having the general formula:

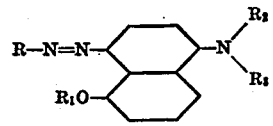

wherein R represents the residue of an aryl nucleus of the benzene series, $R_1$ represents a member selected from the group consisting of hydrogen and alkyl, $R_2$ represents a tetrahydrofuryl radical attached to the nitrogen atom through the carbon atom in the 2-position by means of a saturated straight chain hydrocarbon radical, $R_3$ represents a member selected from the group consisting of hydrogen, an alkyl group, a cycloalkyl group, an aryl group of the benzene series and a tetrahydrofuryl radical attached to the nitrogen atom through the carbon atom in the 2-position by means of a saturated straight chain hydrocarbon radical and wherein the naphthalene nucleus may be further substituted.

15. A cellulose acetate colored with a nuclear nonsulfonated azo dye compound having the general formula:

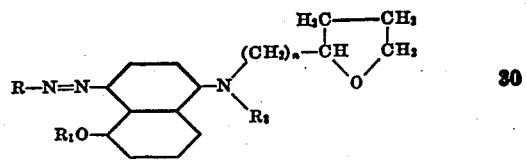

wherein R represents the residue of an aryl nucleus of the benzene series, $R_1$ represents a member selected from the group consisting of hydrogen and an unsubstituted alkyl radical, $n$ represents 1, 2, 3 or 4, $R_3$ represents a member selected from the group consisting of hydrogen, an alkyl group, a cycloalkyl group of the benzene group, an aryl group and a

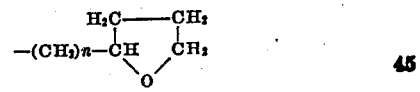

group, wherein $n$ represents 1, 2, 3 or 4, and wherein the naphthalene nucleus may be further substituted.

16. A cellulose acetate colored with a nuclear non-sulfonated azo dye compound having the general formula:

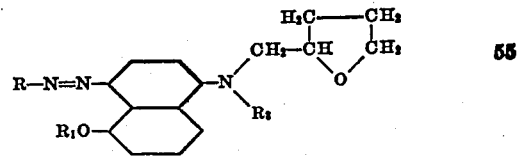

wherein R represents the residue of an aryl nucleus of the benzene series, $R_1$ represents a member selected from the group consisting of hydrogen and an unsubstituted alkyl group, $R_3$ represents a member selected from the group consisting of hydrogen, an alkyl group, a cycloalkyl group, an aryl group of the benzene group and a

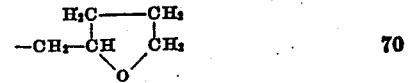

group, and wherein the naphthalene nucleus may be further substituted.

17. A cellulose acetate colored with a nuclear non-sulfonated azo dye compound having the general formula:

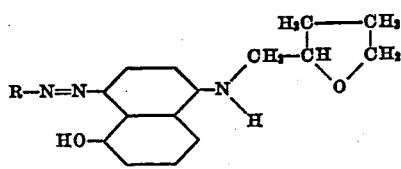

wherein R represents the residue of an aryl nucleus of the benzene series.

18. A cellulose acetate colored with a nuclear non-sulfonated azo dye compound having the general formula:

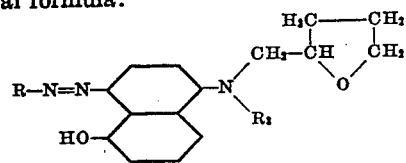

wherein R represents the residue of an aryl nucleus of the benzene series and $R_3$ represents an alkyl group.

JAMES G. McNALLY.
JOSEPH B. DICKEY.

CERTIFICATE OF CORRECTION.

Patent No. 2,183,999.   December 19, 1939.

JAMES G. McNALLY ET AL.

It is hereby certified that error appears in the printed specification of the above numbered patent requiring correction as follows: Page 1, first column, line 21, for the word "wood" read wool; page 7, first column, line 16, claim 11, strike out the words "of the benzene series" and insert the same after "group" in line 17, same claim; and that the said Letters Patent should be read with this correction therein that the same may conform to the record of the case in the Patent Office.

Signed and sealed this 16th day of April, A. D. 1940.

(Seal)
Leslie Frazer
Acting Commissioner of Patents.